United States Patent [19]

Sanders

[11] Patent Number: 4,954,033

[45] Date of Patent: Sep. 4, 1990

[54] TRANSFER MECHANISM FOR CONVEYOR

[75] Inventor: Raymond H. Sanders, Alta Loma, Calif.

[73] Assignee: Unico, Inc., Ontario, Calif.

[21] Appl. No.: 619,531

[22] Filed: Jun. 11, 1984

[51] Int. Cl.$^5$ .................... B65G 57/04; B65H 29/00
[52] U.S. Cl. ................................. 414/27; 198/817; 271/70; 271/196
[58] Field of Search ............ 414/27; 198/404, 689.1, 198/817; 271/70, 83, 196

[56] References Cited

U.S. PATENT DOCUMENTS

| | | | |
|---|---|---|---|
| 2,049,112 | 7/1936 | Fenton | 198/817 X |
| 2,778,388 | 1/1957 | Harrison | 198/404 X |
| 3,842,719 | 10/1974 | Fernandez-Rana et al. | 414/47 X |
| 3,921,827 | 11/1975 | Joice | 414/27 X |
| 4,231,558 | 11/1980 | Aterianus et al. | 417/27 X |
| 4,275,977 | 6/1981 | Joice | 198/689.1 X |

Primary Examiner—Robert J. Spar
Assistant Examiner—Janice Krizek
Attorney, Agent, or Firm—Pretty, Schroeder, Brueggemann & Clark

[57] ABSTRACT

A conveyor system for transporting a succession of thin flexible sheets such as plastic bags from a bag forming device to a bag stacking device. The conveyor system includes a first conveyor having vacuum holes for holding the bags in place, with portions of the bags extending beyond the conveyor's edges. The system further includes bag support apparatus such as a pair of auxiliary conveyors located alongside the first conveyor and supporting the overhanging portions of the bags. The auxiliary conveyors terminate short of the end of the first conveyor, such that for a predetermined distance the overhanging portions of the bags are unsupported, thus permitting a bag stacking device to lift the bags and deposit them onto a stack.

10 Claims, 1 Drawing Sheet

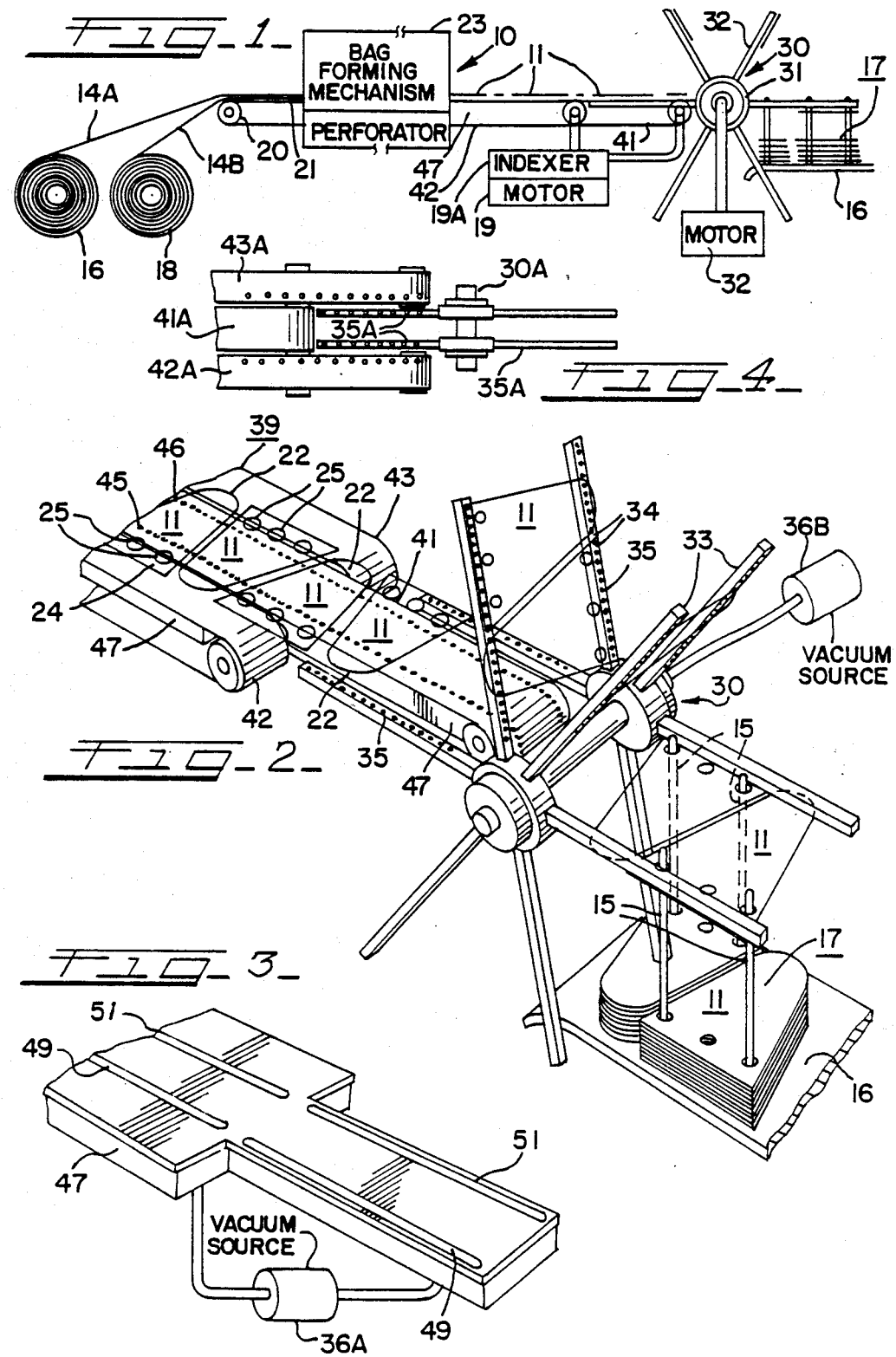

TRANSFER MECHANISM FOR CONVEYOR

BACKGROUND OF THE INVENTION

This invention relates generally to conveyor systems, and, more particularly, to conveyor systems for delivering a succession of this flexible sheets such as plastic bags to a stacking device.

Machines have heretofore been developed for removing discrete materials such as bags from a conveyor onto a stack. For example, U.S. Pat. Re 27,523 entitled "Machine For Automatically Placing Bags on a Wicket" issued to L. Maccherone shows a bag transfer machine. Patent Re 27,523 illustrates a machine for forming bags from plastic materials comprising continuous webs. The individual bags are made by heat-sealing and separating their side seams from the side seams of adjacent bags. The heat sealing and separating are accomplished in various ways as is well known, and the bags are perforated to form mounting holes for stacking purposes. The bags are transferred from the conveyor system and are stacked on the legs of a wicket.

The machine of Patent Re 27,523 comprises a revolving carriage having clamping means adapted to grasp the bag and to revolve the bag over to a position adjacent to the wicket with the mounting holes exposed and positioned to engage the legs of the wicket. A conveyor adjacent to the revolving carriage brings the bags from the output of the production line to the carriage. As the carriage revolves, actuating means close the clamping mechanism near the conveyor for grasping the bag near the mounting holes with these holes exposed, and as the carriage continues to revolve the actuating means releases the clamping means after the bags have been individually engaged on the wicket.

While the transfer mechanism disclosed in Patent Re 27,523 provides generally satisfactory results, the machine lacks positive control of the flexible units and accordingly the machine is susceptible to jamming by the bags. Hence, an operator has to be constantly monitoring the operation.

The present invention is an improvement over the machine shown in Patent Re 27,523. More specifically, the present invention provides complete continuous and positive control of the flexible units during the transfer operation.

SUMMARY OF THE INVENTION

The present invention discloses a transfer mechanism for transferring flexible sheet type units from a conveyor system to a stacking mechanism.

In one embodiment, three conveyor belts positioned alongside, and adjacent, each other carry flexible plastic material bags. The center belt is perforated along the length of travel and a vacuum force is exerted through the perforations to retain the material in a relatively fixed point on the conveyor belt and as the belts move the bags are maintained in a fixed position relative to the belt. The center belt is longer than the other two belts. Pairs of fixed radially extending arms on a revolving member rotate upwardly, with the pairs of arms straddling the longer belt. The ends of the arms extend to a point slightly spaced from the end of the two outer belts.

As the arms move upwardly, they engage one or more bags and lift those bags off of the belt and against the vacuum force holding the bags on the belt. The arms have a surface which is perforated by a series of holes along its length, and vacuum force is exerted through the perforations to hold the bags in a secure positive position on the arms. The pair of arms thus contact and lift the bags off of the belt, move the bags upwardly and around 180° and deposit the bags on associated wicket pins. As the arms move downwardly, the wicket pins engage mounting holes formed on a portion of the bag and remove the bag from the rotating arms to a stacked position.

DESCRIPTION OF THE DRAWINGS

Objects and advantages in addition to those specifically set forth will become apparent from the reference to the accompanying drawings and following description wherein:

FIG. 1 is a side view of a sketch of a plastic bag making machine showing the inventive transfer mechanism;

FIG. 2 is an isometric view of the inventive transfer mechanism;

FIG. 3 is an isometric view of the support plate for the conveyor belts of the inventive transfer mechanism; and FIG. 4 is a sketch of an alternative embodiment of the inventive transfer mechanism.

DETAILED DESCRIPTION OF THE INVENTION

Refer first to FIGS. 1 and 2. In one production-line or system 10 for making plastic bags 11 and utilizing the inventive transfer mechanism 30, the individual bags 11 are made from continuous double web 14A and 14B of a pliable, flexible plastic material. Plastic material is wound on two feed spools 16 and 18 and the webs are drawn through suitable guides and feed rolls, not shown, over a roller 20 of a conveyor system 39, to be in overlapped portion indicated as at 21, all as is well-known in the art.

The plastic webs 14A and 14B are shown as being transparent plastic capable of being heat sealed as at 22, and severed, to form the individual bags 11. A bag forming mechanism 23 of any suitable known type or design such as that shown in patent Re 27,523, for example is used in the system 10.

As is known, the side seams of the individual bags 11 may be formed by well-known, vertically reciprocating heat sealing bars in bag forming mechanism 23. The action of the heater bar forms a bag 11 and severs each bag 11 from the adjacent bag. Each individual bag 11 is then conveyed by the conveyor belt system 39 into operative relationship with the inventive transfer mechanism 30 as will be described in detail further below.

Each bag 11 includes a projecting portion on a side of the webs to form a flap 24 on the open end of each bag.

The bag forming mechanism 23 includes suitable perforating devices for forming mounting apertures or holes 25 in flap portion 24 of each bag 11, as is well-known. The operation of the bag forming mechanism 23 and the rate of feed of the webs 14A and 14B are synchronized so that the mounting holes 25 are accurately located in the same respective positions in each flap portion 24 of each bag 11. Such synchronizing control is well-known in the bag making art.

The conveyor belt system 39, which forms an important part of this invention, comprises three belts 41, 42 and 43 positioned in side-by-side relation, and the belts are driven in synchronism by a motor 19 and indexer 19A, both of which may be of any suitable known type and design. As more clearly seen from FIG. 2, the center belt 41 is longer and extends farther than the two other belts 42 and 43 which straddle belt 41. In the embodiment shown, belt 41 includes a pair of continuous rows of small holes or perforations 45 and 46.

Refer now also to FIG. 3 which shows an elongated belt support frame 47 which is positioned beneath and provides support to the belts 41, 42 and 43. The belts 41, 42 and 43 move or rotate around the frame 47. The frame 47 includes a pair of channels 49 and 51 extending lengthwise along the frame The channels 49 and 51 are in alignment, or accomodate, respective rows of holes 45 and 46 formed in belt 41. A vacuum source 36A, of any suitable known type, is connected through suitable conduits to channels or recesses 49 and 51 to provide a vacuum force thereto. As will be appreciated when the belt 41 is placed around frame 47, the vacuum force is effective via the channels 49 and 51, and through the rows of holes 45 and 46 formed in belt 41 to the bags 11 on the surface of belt 41. It will further be appreciated that the flexible plastic bags 11, or similar light material, will be positively or securely held in its relative position on belt 41 by this vacuum force. Each bag is thus securely retained in its relative position on belt 41 as the belt travels in a continuous movement.

As mentioned above, at least a portion of the bags 11 extend over the side of belt 41. This may be done conveniently by selectively positioning the feed rolls 16 and 18. In the embodiment, the bags 11 are dimensioned so that the extremities of the bags are greater than the width of belt 41. The flap portion 24 of each bag 11 thus extends over and rides on the outer belt 42, while the lower or closed end of each bag 11 may extend over and ride on the outer belt 43. As mentioned above, the three belts are driven in synchronism.

The inventive transfer mechanism 30 of FIG. 2 comprises a revolving axle 31 driven by an electric motor 32 of a suitable known design. Pairs of arms or extensions 33 positioned in axial alignment with each other, and circumferentially spaced from each other extend radially outwardly from the axle 31. In the embodiment shown six pairs of arms 33 extend outwardly from the axle in equal angular spacing. The arms 33 include an internal elongated hollow and have a plurality of apertures or holes 34 extending from the hollow, along the length of the arms, and outwardly on one surface 35 thereof (the bag engaging surface) as will be described. A source of vacuum force 36B is coupled through suitable conduits or channeled to the hollow and holes 34.

Note that each pair of arms 33 straddle the extended end of belt 41, and the ends of the arms 33 extend to a point adjacent the ends (or return point) of belts 42 and 43. In the embodiment shown, the arms 33 transfer two bags at a time. It can be readily appreciated that one or more bags can be tranferred at a time dependent on the size and shape of the bags. In FIG. 2, as the trailing edge of the second bag of a pair is moved past the ends of belts 42 and 43, a pair of arms 33 moves upwardly to lift the bag upwardly and against the vacuum force effective through the holes 45 and 46 in belt 41, and remove the bag from the belt 41. Also since the arms 33 have a vacuum force effective through their holes 34, the bags 11 are now firmly held in position on the surface 35 of arms 33, as the arms rotate toward a stacking location 17. In the embodiment shown, the bags 11 are on the arms 33 for approximately 180°. The bags 11 are then automatically positioned, or stacked, on wicket pins 15 located on a movable stacking mechanism 16 of any suitable known type. One or more pins 15 on each wicket stacking position enter into the holes 25 on bags 11 to effectively engage or grab and remove the bags from the arms 33.

A modification of the embodiment shown in FIG. 2 is depicted in FIG. 4. In the embodiment of FIG. 4, the two outer belts 42A and 43A are longer than the center belt 41A and the transfer mechanism 30A includes arms 35A which extend between the inner edges of the two outer belts. The ends of the arms 35A terminate at a point adjacent the end of the center belt 41A. In this embodiment, the outer belts 43A and 42A include the rows of apertures for channeling the vacuum force to the bags. The operation of the structure of FIG. 4 is generally similar to that of the structure of FIG. 2.

A modification to the structure of FIG. 2 for certain applications is as follows. In FIG. 2, a smooth flat stationary surface is provided in lieu of moving belts 42 and 43. In FIG. 4, a smooth flat stationary surface is provided in lieu of moving belt 41A. The foregoing modification could be used where the bags are made of relatively stiffer, and less flexible material.

While the invention has been particularly shown and described with reference to a preferred embodiment thereof, it will be understood by those skilled in the art, that various changes in form and details may be made therein without departing from the spirit and scope of the invention.

I claim:

1. A conveyor system for conveying a succession of this flexible sheets from a sheet forming mechanism to a sheet stacking mechanism, comprising in combination:
   (a) a first conveyor belt for carrying a succession of thin flexible sheets from a sheet forming mechanism, said first conveyor belt having a plurality of vent holes therein, said sheets being positioned to extend beyond at least one side of said belt;
   (b) a source for providing a vacuum force through said vent holes to hold said sheets onto said belt;
   (c) auxiliary conveyor belt means operatively positioned alongside said first belt at least in the region of said sheet forming mechanism, to support the portion of said sheets extending beyond the side of said first belt, said first belt and said auxiliary conveyor belt means being flat and substantially level and underlying substantially the entire surface of each sheet;
   (d) wherein aid first belt extends beyond the end of said auxiliary conveyor belt means a sufficient distance to support at least one entire sheet, with a portion of the sheet overhanging one side of said first belt; and
   (e) transfer means having extensions movable upwardly adjacent at least one side of said first belt to lift the overhanging portion of each sheet off of said first belt and deposit the sheet onto a sheet stacking mechanism.

2. A conveyor system as in claim 1 wherein said auxiliary conveyor belt means comprises two belts straddling said first conveyor belt.

3. A conveyor system as in claim 1 wherein said transfer means comprises a wicketer having arms rotatably movable upwardly in an arc adjacent said first belt and underneath said sheets to selectively lift and transfer each of said sheets in sequence.

4. A conveyor system as in claim 1 wherein said transfer means extensions are positioned alongside said first belt and have distal ends which operate adjacent the end of said auxiliary belt means.

5. A conveyor system for conveying a succession of thin flexible bags from a bag forming mechanism to a bag stacking mechanism, said bags having mounting holes formed therein, comprising in combination:
   (a) conveyor belt means for carrying a succession of thin flexible bags from a bag forming mechanism, said conveyor belt means having a plurality of holes therein, the bags extending over at least one side of said conveyor belt means;
   (b) a source for providing a vacuum force through said holes to hold said bags onto said conveyor belt means;
   (c) bag support means positioned alongside said conveyor belt means at least in the region of said bag forming mechanism, to support the overhanging sides of said bags in the region of the bag forming mechanism, said conveyor belt means and said bag support means being flat and substantially level and underlying substantially the entire surface of each bag;
   (d) wherein said conveyor belt means extends beyond the end of said bag support means a sufficient distance to support at least one entire bag, with a portion of the bag overhanging one side of said conveyor belt means; and
   (e) transfer means having rotatable extensions, means defining a plurality of holes on said extensions, and means for providing a vacuum force through said holes on said extensions, said extensions being movable upwardly adjacent the sides of said conveyor belt means to lift the overhanging portion of each bag and transfer said bag off of said conveyor belt means and onto a bag stacking mechanism, said vacuum force holding said bags securely on said extensions during the transfer;
   (f) wherein said bag stacking mechanism has projections which align with said mounting holes and are received into said mounting holes whereby said bag is removed from said transfer means into a stacked position.

6. A conveyor system for conveying a succession of thin flexible bags from a bag forming mechanism to a bag stacking mechanism, said bags having mounting holes formed therein, comprising in combination:
   (a) a first conveyor belt for carrying a succession of thin flexible bags from a bag forming mechanism, said first conveyor belt having a plurality of vent holes therein and being of a width less than the width of said bags;
   (b) a source for providing a vacuum force through said vent holes to hold said bags onto said belt;
   (c) auxiliary conveyor belt means positioned alongside said first belt at least in the region of said bag forming mechanism, to support the sides of said bags, said first conveyor belt and said auxiliary conveyor belt means being flat and substantially level and underlying substantially the entire surface of each bag;
   (d) wherein said first belt extends beyond the end of said auxiliary belt means a sufficient distance to support at least one entire bag with a portion of the bag overhanging one side of said first belt; and
   (e) transfer means having extensions, means defining a plurality of holes on said extensions, and means for providing a vacuum force through said holes on said extensions, said extensions being movable upwardly adjacent the sides of said first belt to lift the overhanging portion of each bag and transfer said bag off of said first belt and onto a bag stacking mechanism, said vacuum force holding said bag securely on said extensions during the transfer;
   (f) wherein said bag stacking mechanism has projections which align with said mounting holes and are received into said mounting holes whereby said bag is removed from said transfer means into a stacked position.

7. A conveyor system for conveying a succession of thin flexible bags from a bag forming mechanism to a bag stacking mechanism, comprising in combination:
   (a) conveyor belt means for carrying a succession of thin flexible bags from a bag forming mechanism, said conveyor belt means having a plurality of vent holes therein and being of a width less than the width of said bags;
   (b) a source for providing a vacuum force through said vent holes to hold said bags onto said belt means;
   (c) bag support means positioned adjacent said belt means at least in the region of said bag forming mechanism, to support portions of said bags, said conveyor belt means and said bag support means being flat and underlying substantially the entire surface of each bag;
   (d) wherein said belt means extends beyond said bag support means a sufficient distance to support at least one entire bag, with a portion of the bag overhanging one side of said belt means; and
   (e) transfer means having extensions, said extensions having means to effect a vacuum force therein, said extensions being movable upwardly adjacent the sides of said belt means to lift the overhanging portion of each bag and transfer said bag off of said belt means and onto a bag stacking mechanism, the vacuum force effected on said extensions holding said bags on said extensions to a selected position.

8. A conveyor system as in claim 5 wherein said bag support means straddles said conveyor belt means.

9. A conveyor system as in claim 6, wherein said auxiliary conveyor belt means straddles said first conveyor belt.

10. A conveyor system as in claim 7 wherein said bag support means straddles said conveyor belt means.

* * * * *